United States Patent [19]

Alper et al.

[11] Patent Number: 4,688,512

[45] Date of Patent: Aug. 25, 1987

[54] BACKLIGHTED TRIP INDICATOR

[75] Inventors: Daniel D. Alper, Ypsilanti; Kenneth C. Bakhaus, Jackson; Michael H. Estkowski, St. Joseph, all of Mich.

[73] Assignee: Mechanical Products, Inc., Jackson, Mich.

[21] Appl. No.: 884,094

[22] Filed: Jul. 10, 1986

Related U.S. Application Data

[63] Continuation of Ser. No. 708,065, Mar. 4, 1985, abandoned.

[51] Int. Cl.[4] .......... G09F 9/00; G02B 5/04

[52] U.S. Cl. .......... 116/279; 116/DIG. 28; 116/202

[58] Field of Search .......... 116/202, 250, 251, 256, 116/263, 279, 281, 286, 287, 310, DIG. 5, DIG. 15; 200/308, 310, 311, 313, 314, DIG. 47; 250/465; 335/17

[56] References Cited

U.S. PATENT DOCUMENTS

| | | | |
|---|---|---|---|
| 3,213,269 | 10/1965 | Melvin et al. | 116/DIG. 28 |
| 3,636,915 | 1/1972 | Ruppert | 200/311 |
| 4,385,221 | 5/1983 | Dörfler | 200/314 |
| 4,409,574 | 10/1983 | Misencik et al. | 335/18 |
| 4,412,193 | 10/1983 | Bienwald et al. | 335/18 |
| 4,466,042 | 8/1984 | Zylstra et al. | 335/17 |

FOREIGN PATENT DOCUMENTS

| | | | |
|---|---|---|---|
| 1081958 | 5/1960 | Fed. Rep. of Germany | 200/312 |
| 2032839 | 3/1979 | Fed. Rep. of Germany | 116/279 |

*Primary Examiner*—Charles Frankfort
*Assistant Examiner*—W. Morris Worth
*Attorney, Agent, or Firm*—Lyman R. Lyon

[57] ABSTRACT

A back lighted trip indicator for a circuit breaker comprising an opaque tubular shield and a light translucent prism telescopically received in the shield and movable from a position totally within said shield when the manual operator is in the "ON" position to an exposed condition when the manual operator moves to the "OFF" position thereby to reflect ambient light through a frontal face on the prism to back light indicia on the frontal face of the prism.

1 Claim, 5 Drawing Figures

BACKLIGHTED TRIP INDICATOR

This is a continuation of co-pending application Ser. No. 708,065 filed on Mar. 4, 1985 now abandoned.

BACKGROUND OF THE INVENTION

Electrical circuit protectors generally have provision for indicating the condition of the circuit containing the protector. For example, mechanical extension, indicia exposure, and opening or closure of an electrical lighting circuit are well known. While it is known to use optical change, no known prior art system is adequately simple, effective, and low in cost.

SUMMARY OF THE INVENTION

The trip indicator of the present invention features an indicia display that is normally dark. Movement of a manual operator to the tripped condition effects back lighting of the indicia on an image face of the manual operator by a plurality of prisms positioned behind the face thereby to indicate the condition of the circuit breaker. The prisms are utilized to reflect ambient light to the image face and are movable between two positions, only one of which exposes the prisms to light.

BRIEF DESCRIPTION OF THE DRAWINGS

The invention is illustrated in the drawings wherein.

DETAILED DESCRIPTION OF THE PREFERRED EMBODIMENT OF THE INVENTION

Figure 1:
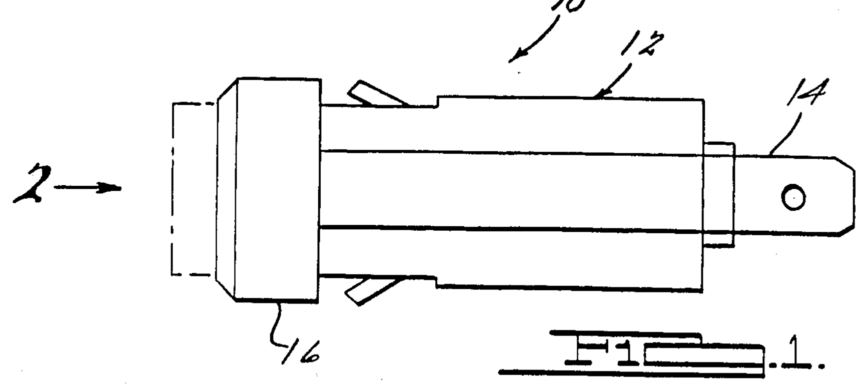
FIG. 1 is a side elevation view of a circuit breaker utilizing the indicia display of the instant invention.

As seen in FIG. 1, a circuit breaker 10 comprises a housing 12 of rectangular configuration having terminals 14 at one end thereof, one of which is illustrated.

In accordance with the present invention, the housing 12 has a trip indicator shield 16 at the opposite end thereof from the terminals 14. As best seen in FIGS. 2-5, the trip indicator comprises a reflecting prism 18 having reflecting surfaces 20, 22, 24 and 26, an image surface 28 and a support sleeve 30 slidably received within the shield 16. The sleeve 30 is telescopically received over and mechanically secured to a manual operator 32 of the circuit breaker 10. The mechanical and electrical components of the circuit breaker 10 from the manual operator 32 inwardly are conventional.

Figure 2:
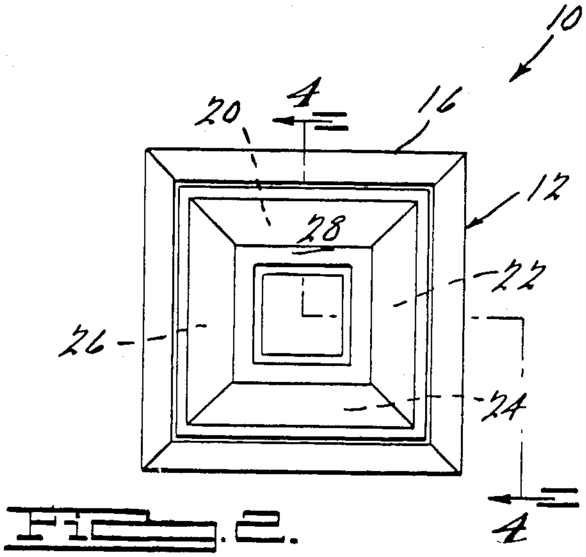
FIG. 2 is a view taken in the direction of the arrow "2" of FIG. 1 with the trip indicator in the "normal" or "ON" condition of FIG. 2.
Figure 3:
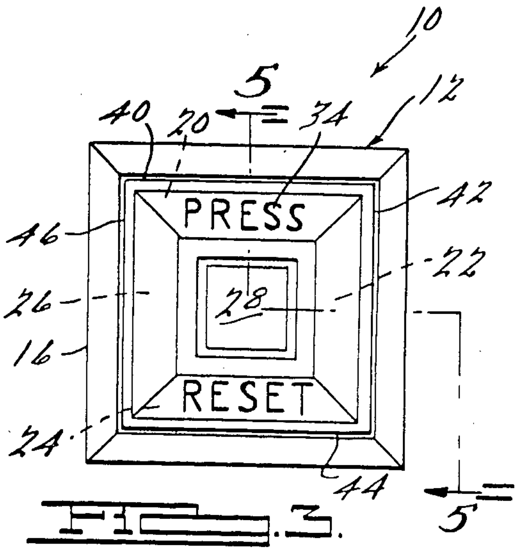
FIG. 3 is a view similar to FIG. 2 with the trip indicator in the "tripped" condition.
Figure 4:
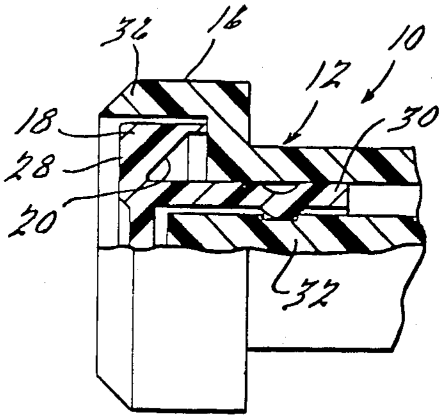
FIG. 4 is a sectional view taken along line 4—4 of FIG. 2.
Figure 5:
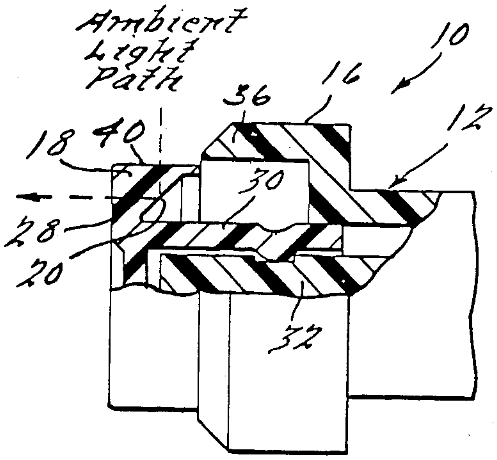
FIG. 5 is a sectional view taken along line 5—5 of FIG. 3.

The "ON" or "normal" position of the circuit breaker 10 and therefore of the manual operator 32 and prism 18 is illustrated in FIGS. 2 and 4 and the "OFF" or "tripped" position is illustrated in FIGS. 3 and 5. The prism 18 is effective to backlight indicia 34 on the image surface 28 when the manual operator 32 moves to the "tripped" condition as shown in FIGS. 3 and 5. The reflecting surfaces 20, 22, 24 and 26 may comprise highly polished surfaces or they may be suitably mirrorized, for example, by a vacuum deposit of aluminum. It is to be noted that the prism 18 must be formed of transparent or translucent material, for example, clear glass, lucite or acrylic.

The indicia 34 is positioned on the image face 28 of the prism 18 which extends at a right angle to the ambient light path from the reflecting surfaces 20, 22, 24 and 26. The indicia 34 is normally substantially invisible since an outer peripheral wall 36 of the light shield 16, preferably molded from black opaque plastic, precludes ambient light from reaching the prism reflective surfaces 20, 22, 24 and 26.

Movement of the manual operator 32 and prism 18 to the left as seen in FIGS. 3 and 5 exposes laterally outer surfaces 40, 42, 44 and 46 thereof to ambient light which is reflected by the surfaces 20, 22, 24 and 26, respectively, through the image surface 28 thereby backlighting the indicia 34.

One feature to be noted is that the reflective surfaces 20, 22, 24 and 26 extend to close proximate relation to the frontal image surface 28 thereby to minimize light transmission losses. Another feature is that the wall 36 of the light shield 16 extends well beyond the image surface 28 to maximize efficiency of the shield 16 in precluding back lighting of the indicia. Further the use of black plastic for the shield 16 materially enhances the shield's ability to block ambient light from reaching the reflecting surfaces 20, 22, 24 and 26.

From the foregoing it should be apparent that the trip indicator of the instant invention is movable from a "normal" or "ON" position in which condition indicating indicia is shielded from ambient light so as to be rendered substantially invisible, to a "tripped" or "OFF" condition in which position a prism of unique configuration effects backlighting of the indicia on the image surface of the prism.

While the preferred embodiment of the invention has been disclosed, it should be appreciated that the invention is susceptible of modification without departing from the scope of the following claims.

We claim:

1. A back lighted trip indicator for a circuit breaker comprising a circuit breaker housing, a reciprocable manual operator in said housing movable between an "OFF" and "ON" position, said housing comprising an opaque tubular shield at one end thereof having an enlarged rectangular opening comprising a longitudinally extending flange defining said opening, a light translucent prism having a frontal face, a tubular portion disposed centrally of said face being attached to and movable with said manual operator within said housing, and outer side surfaces adjoining said frontal face and telescopically received in and guided by said flange, said prism having four internal light reflecting surfaces disposed in a rectangular array around and extending from the tubular portion thereof, each of said reflecting surfaces being orientated at a 45° angle to the direction of movement of said manual operator and in close proximate relation to said frontal face, said reflecting surfaces being orientated to reflect laterally received ambient light axially outwardly through a rectangular portion of said frontal face of said prism, said prism having a longitudinal dimension relatively less than that of a longitudinal dimension of said flange of said shield so as to be movable to a first position wherein said outer side surfaces and said internal light reflecting surfaces are totally received in said rectangular opening and thereby not exposed to laterally received ambient light and thereby defining said "ON" position of said manual operator, said prism being movable to a second position wherein said outer side surfaces and said internal light reflecting surfaces are exposed to laterally received ambient light wherein said light is reflected through said rectangular portion of said frontal face of said prism and thereby defining said "OFF" position of said manual operator, the frontal face of said prism extending at a right angle to the direction of movement of said manual operator, and indicia on the rectangular portion of said frontal face of said prism which is back lighted only when said manual operator is in the "OFF" position.

* * * * *